(No Model.)
T. LOWDEN.
PLOW JOINTER.
No. 362,023. Patented Apr. 26, 1887.
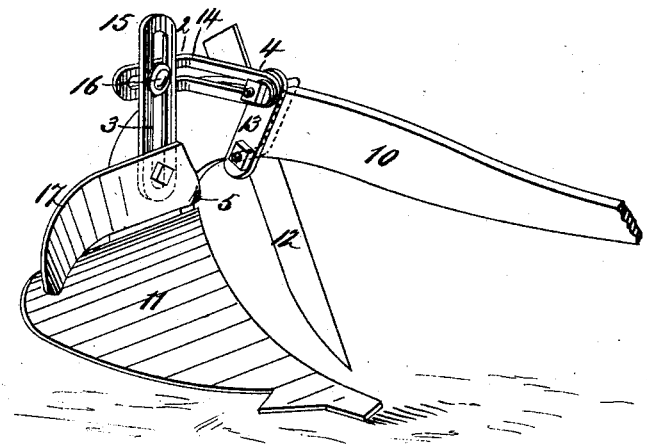
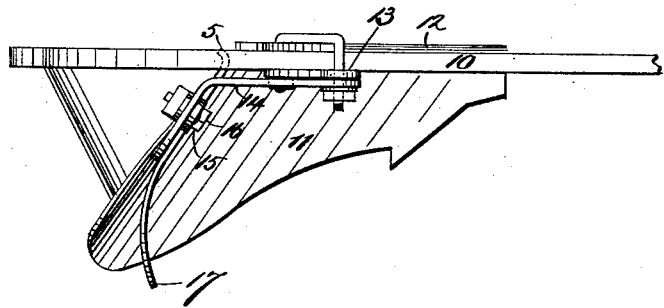
WITNESSES:
F. McArdle
C. Sedgwick
INVENTOR:
T. Lowden
BY Munn & Co.
ATTORNEYS.

UNITED STATES PATENT OFFICE.

THOMAS LOWDEN, OF LOWELL, ASSIGNOR OF ONE-HALF TO DAVID M. SKIDMORE, OF BOWNE TOWNSHIP, MICHIGAN.

PLOW-JOINTER.

SPECIFICATION forming part of Letters Patent No. 362,023, dated April 26, 1887.

Application filed December 9, 1886. Serial No. 221,073. (No model.)

*To all whom it may concern:*

Be it known that I, THOMAS LOWDEN, of Lowell, in the county of Kent and State of Michigan, have invented a new and Improved Plow-Jointer, of which the following is a full, clear, and exact description.

My invention relates to improvements in plow-jointers for cutting off the edge of the furrow-slice and depositing it into the previous furrow; and the invention consists in the peculiar construction and arrangement of parts, as hereinafter fully described, and pointed out in the claims.

Reference is to be had to the accompanying drawings, forming a part of this specification, in which similar figures of reference indicate corresponding parts in both the views.

Figure 1 is a perspective view of a plow provided with a jointer that is constructed in accordance with the terms of my invention, and Fig. 2 is a plan view of the plow and its attachments.

In the drawings, 10 represents the beam, and 11 the mold-board, of an ordinary form of plow, said plow being provided with a colter, 12, that is held thereto by a clip, 13. The jointer consists of a rearwardly-extending and centrally-slotted link, 14, that is bent outward at the point 2 at an angle of one hundred and thirty-five degrees, a vertical link, 15, that is formed with a central longitudinal slot, 3, being held to the link 14 by a bolt, 16.

To the bottom of the link 15 there is secured an outwardly-extending blade, 17, that is preferably about fourteen inches long and three inches wide, and made of steel, the outer end of the blade being bent forward, as shown.

The link 14 is held to place by one of the retaining-nuts of the clip 13, and, as said link is centrally slotted, as shown at 4, it may be adjusted so as to carry the jointer-blade 17 forward or back, as may be required to suit the particular plow in connection with which the jointer is to be employed, the vertical and lateral adjustment being secured by properly adjusting the bolt 16.

I have found it convenient to make the links 14 and 15 about ten inches in length, and I have also found it convenient to make the slot in that portion of the link 14 which is parallel with the beam 10 three-quarters of an inch in width to accommodate a three-quarter U retaining-bolt for the clip 13, the other portion of the slot and the slot 3 of the link 15 being preferably one-half inch in width.

The inner lower corner, 5, of the blade 17 is bent over across the standard of the plow, thus preventing the clogging of the parts.

Such a jointer as has been described will not susceptibly increase the draft of the plow, and will be found to act substantially in the manner of the ordinary form of jointer; but, owing to the peculiar construction of the jointer forming the subject-matter of this application, it can be used as an attachment for any form of plow irrespective of the use to which the plow is to be put.

Having thus fully described my invention, I claim as new and desire to secure by Letters Patent—

1. The combination, with a plow, of the slotted angular link 14, secured to the plow-beam, the slotted straight link 15, secured to the link 14, and the blade 17 on the lower end of the link 15, substantially as herein shown and described.

2. An improved plow-jointer, consisting of the blade 17, having its outer end bent forward, the slotted link 15, to the lower end of which the blade 17 is secured, and the angular slotted link 15, adjustably secured to the link 14, substantially as herein shown and described.

THOMAS LOWDEN.

Witnesses:
 MILTON M. PERRY,
 JOSEPH K. FAIRCHILD.